US012756015B2

(12) United States Patent
Cheng et al.

(10) Patent No.: US 12,756,015 B2
(45) Date of Patent: Oct. 6, 2026

(54) LITHIUM BIS(FLUOROSULFONYL)IMIDE AND PREPARATION METHOD THEREOF, ELECTROLYTIC SOLUTION AND SECONDARY BATTERY

(71) Applicants: CONTEMPORARY AMPEREX TECHNOLOGY CO., LIMITED, Ningde (CN); CATL-SICONG NOVEL MATERIALS CO., LTD, Longyan City (CN)

(72) Inventors: Sicong Cheng, Longyan City (CN); Qisen Huang, Ningde (CN)

(73) Assignees: CONTEMPORARY AMPEREX TECHNOLOGY CO., LIMITED, Ningde (CN); CATL-SICONG NOVEL MATERIALS CO., LTD, Longyan City (CN)

( * ) Notice: Subject to any disclaimer, the term of this patent is extended or adjusted under 35 U.S.C. 154(b) by 605 days.

(21) Appl. No.: 18/231,255

(22) Filed: Aug. 8, 2023

(65) Prior Publication Data

US 2023/0387467 A1 Nov. 30, 2023

Related U.S. Application Data

(63) Continuation of application No. PCT/CN2022/074931, filed on Jan. 29, 2022.

(51) Int. Cl.
*H01M 10/0568* (2010.01)

(52) U.S. Cl.
CPC ............................... *H01M 10/0568* (2013.01)

(58) Field of Classification Search
CPC ................................................ H01M 10/0568
See application file for complete search history.

(56) References Cited

U.S. PATENT DOCUMENTS 8,815,199 B2 8/2014 Morinaka et al.
12,630,425 B2 * 5/2026 Schmidt ................ C01B 21/086
2012/0020867 A1 * 1/2012 Morinaka ................. C07F 9/26
423/386

(Continued)

FOREIGN PATENT DOCUMENTS

CN 102378755 A 3/2012
CN 104495767 A 4/2015

(Continued)

OTHER PUBLICATIONS

Zhang Tong-Qi, "Research Progress in Synthesis and Application of Lithium Bisfluorosulfonylimide", Chemical Engineering Design Communications, Jan. 28, 2020, pp. 140-141 (2 pages including English Abstract).

(Continued)

*Primary Examiner* — Wayne A Langel
(74) *Attorney, Agent, or Firm* — XSENSUS LLP

(57) ABSTRACT

The present application provides a method for preparing lithium bis(fluorosulfonyl)imide, which may include the following steps: (a) a synthesis step; (b) an evaporation step; (c) an extraction step; (d) an alkalinization step; (e) a dehydration step; (f) a desolventization step; (g) a crystallization step; and (h) a drying step; lithium bis(fluorosulfonyl)imide prepared by the method, an electrolytic solution containing the lithium bis(fluorosulfonyl)imide, and a secondary battery thereof.

18 Claims, 3 Drawing Sheets

(56) References Cited

U.S. PATENT DOCUMENTS

2015/0249269 A1 9/2015 Yoon et al.

FOREIGN PATENT DOCUMENTS

| | | | | | |
|---|---|---|---|---|---|
| CN | 104671224 A | | 6/2015 | | |
| CN | 106044728 A | | 10/2016 | | |
| CN | 107188138 A | | 9/2017 | | |
| CN | 107215853 A | | 9/2017 | | |
| CN | 110436424 A | * | 11/2019 | ........... | C01B 21/086 |
| CN | 110540176 A | | 12/2019 | | |
| CN | 111320151 A | | 6/2020 | | |
| CN | 111573639 A | | 8/2020 | | |
| CN | 111620315 A | * | 9/2020 | ........... | C01B 21/086 |
| CN | 111792630 A | | 10/2020 | | |
| CN | 112919435 A | * | 6/2021 | ........... | C01B 21/086 |
| CN | 113582145 A | | 11/2021 | | |
| CN | 113800458 A | | 12/2021 | | |
| CN | 113800485 A | | 12/2021 | | |
| WO | 2020/102907 A1 | | 5/2020 | | |

OTHER PUBLICATIONS

Qian et. al., "High rate and stable cycling of lithium metal anode", Nature Communications | DOI: 10.1038/ncomms7362, Feb. 20, 2015, pp. 1-9.

First Office Action mailed on Sep. 13, 2022, received for CN Application 202210111616.0, 20 pages including English Translation.

International Search Report and Written Opinion mailed on Oct. 25, 2022, received for PCT Application PCT/CN2022/074931, filed on Jan. 29, 2022, 9 pages including English Translation.

The First Office Action mailed Sep. 7, 2022, in Chinese Application No. 202210111591.4, 14 pages including English translation.

International Search Report mailed on Oct. 26, 2022, received for PCT Application PCT/CN2022/074934 filed on Jan. 29, 2022, 5 pages including English Translation.

Written Opinion mailed on Oct. 26, 2022, received for PCT Application PCT/CN2022/074934 filed on Jan. 29, 2022, 9 pages including English Translation.

* cited by examiner schematic flow chart of crystallization and drying section process

LITHIUM BIS(FLUOROSULFONYL)IMIDE AND PREPARATION METHOD THEREOF, ELECTROLYTIC SOLUTION AND SECONDARY BATTERY

CROSS-REFERENCE TO RELATED APPLICATION

The present application is a continuation of International Application No. PCT/CN2022/074931, filed Jan. 29, 2022, which is incorporated herein by reference in its entirety.

TECHNICAL FIELD

The present application relates to a method for preparing lithium bis(fluorosulfonyl)imide, lithium bis(fluorosulfonyl) imide prepared by the method, an electrolytic solution containing the lithium bis(fluorosulfonyl)imide prepared by the method, and a secondary battery thereof.

BACKGROUND

As lithium bis(fluorosulfonyl)imide (LiFSI) has a special molecular structure, it is possible to obtain higher conductivity by adding LiFSI to an electrolytic solution. Meanwhile, LiFSI also has the characteristics of high thermal stability, wide electrochemical window, and low corrosion rate, and can improve cycle performance and rate performance of power batteries especially in power batteries, and thus is an excellent choice for an electrolyte lithium salt of lithium ion batteries.

In the prior art, synthesis and purification of LiFSI have many problems in industrialized large-scale production. The synthesis process is cumbersome, long in time, low in product conversion rate, and large in consumption of raw and auxiliary materials and difficult for recycling, and therefore low in economy. The present disclosure aims to solve at least some of these problems, and proposes anew continuous method for producing LiFSI, so that LiFSI reaches battery-level standards in aspects of purity and water content, is low in production cost and less in three wastes, and is suitable for industrial production.

SUMMARY

The present application is carried out in view of the above-mentioned problems, and its purpose is to provide a method for preparing lithium bis(fluorosulfonyl)imide in order to solve problems of low product purity, high moisture, high production cost and many three wastes in the preparation of LiFSI in the prior art.

In order to achieve the above purpose, the present application provides a method for preparing lithium bis(fluorosulfonyl)imide, lithium bis(fluorosulfonyl)imide prepared by the method, an electrolytic solution containing the lithium bis(fluorosulfonyl)imide prepared by the method and a secondary battery thereof.

A first aspect of the present application provides a method for preparing lithium bis(fluorosulfonyl)imide, including the following steps:

(a) a synthesis step: subjecting sulfuryl fluoride, ammonia gas and triethylamine to reaction in a reaction kettle in the presence of a solvent to obtain a stream $\alpha 1$ containing ($SO_2F$—NH—$SO_2F$)·$Et_3N$, a triethylamine hydrogen fluoride salt and triethylamine;

(b) an evaporation step: performing evaporation on the stream $\alpha 1$ to obtain a stream $\alpha 2$ containing ($SO_2F$—NH—$SO_2F$)·$Et_3N$ and the triethylamine hydrogen fluoride salt, performing post-treatment on the evaporated solvent and the triethylamine optionally, and then looping back to step (a);

(c) an extraction step: washing the stream $\alpha 2$ obtained in step (b) with water in an extraction tower or a static mixer to obtain an oil phase $\alpha 3$ containing ($SO_2F$—NH—$SO_2F$)·$Et_3N$ and an aqueous phase $\alpha_{water}$ containing the triethylamine hydrogen fluoride salt, and separating out the oil phase $\alpha 3$;

(d) an alkalinization step: delivering the oil phase $\alpha 3$ obtained in step (c) to an evaporator to be mixed with a lithium hydroxide aqueous solution to obtain a mixture stream $\beta 1$-1, and then performing reduced-pressure evaporation on the stream $\beta 1$-1 to obtain a stream $\beta 1$-2 containing lithium bis(fluorosulfonyl)imide;

(e) a dehydration step: adding the stream $\beta 1$-2 containing the lithium bis(fluorosulfonyl)imide and an ester solvent to an evaporator for evaporation to obtain a stream $\beta 2$ containing lithium bis(fluorosulfonyl)imide;

(f) a desolventization step: adding the stream $\beta 2$ obtained in step (e) and an ester solvent to an evaporator for evaporation to obtain crude lithium bis(fluorosulfonyl) imide $\beta 3$; and (g) a crystallization step: pumping the crude lithium bis(fluorosulfonyl)imide $\beta 3$ obtained in step (f) to a crystallization kettle, and adding dichloromethane to precipitate lithium bis(fluorosulfonyl)imide crystals.

By applying the preparation method of the present application, LiFSI with high purity and low moisture can be obtained. And the preparation method can be used for continuous production with low production costs and less three wastes, and has high industrial application value.

In any embodiment, optionally, the method further includes the following step:

(h) a drying step: purging with an inert gas the lithium bis(fluorosulfonyl)imide crystals precipitated in step (g) in a drier, to obtain powered lithium bis(fluorosulfonyl)imide crystals with a water content lower than 50 ppm.

In any embodiment, optionally, in step (a), a molar ratio of the sulfuryl fluoride:the ammonia gas:the triethylamine is (1.5-3.5):1:(1-6), optionally (2-3):1:(1-5).

In any embodiment, optionally, in step (a), the solvent is selected from acetonitrile, propionitrile, isopropionitrile, diethyl ether, propyl ether, isopropyl ether, tetrahydrofuran, acetone, butanone, methyl isobutyl ketone, methyl pyrrolidone or a mixture of any two or more thereof, preferably, acetonitrile.

In any embodiment, optionally, in step (a), reaction temperature of the reaction is not higher than 25° C., optionally 3° C.-20° C.; and/or, reaction pressure of the reaction is not higher than 0.4 MPa, optionally not higher than 0.25 MPa.

In any embodiment, optionally, between step (a) and step (b), the method further includes a step of filtering the stream $\alpha 1$ to remove a by-product sulfonamide ($NH_2$—$SO_2$—$NH_2$) solid, for example, performing filtration by using a tetrafluoro filter bag with a pore diameter of 5 μm to 20 μm.

In any embodiment, optionally, in step (b), the stream $\alpha 1$ is evaporated by using a falling film evaporator.

In any embodiment, optionally, in step (c), the aqueous phase containing the triethylamine hydrogen fluoride salt is delivered for recycling treatment, and triethylamine obtained after the aqueous phase is subjected to alkalinization and purification treatment is recyclable.

In any embodiment, optionally, in step (d), the oil phase α3 is mixed and stirred with the lithium hydroxide aqueous solution for reaction for 0.5-3 hours, optionally 1-2 hours.

In any embodiment, optionally, in step (d), a condensate obtained by evaporating the stream β1-1 is subjected to standing liquid separation, an upper layer liquid is a triethylamine aqueous solution, and the upper layer liquid is delivered for recycling treatment; and a lower layer liquid is condensed water, and the lower layer liquid is recycled to prepare the lithium hydroxide aqueous solution required for the alkalinization step.

In any embodiment, optionally, in step (d), a volume ratio of the stream α3 to the lithium hydroxide aqueous solution is optionally (0.8-5):1, optionally (1-1.2):1.

In any embodiment, optionally, in step (e) and step (f), an aqueous solution of the ester solvent obtained by condensation is delivered for recycling treatment.

In any embodiment, optionally, in step (e), the obtained stream β2 contains 0.1 vol % to 2 vol % of the water and the 20 vol % to 40 vol % of the ester solvent.

In any embodiment, optionally, the crude lithium bis(fluorosulfonyl)imide β3 obtained in step (f) has a water content of 2000 ppm to 4000 ppm, preferably a water content of 3000 ppm.

In any embodiment, optionally, step (e) and step (f) are performed in a same evaporator, or step (e) and step (f) are performed in different evaporators.

In any embodiment, optionally, during step (d) and step (e), a following side reaction takes place:

$$(SO_2F—N—SO_2F)^{-}Li^{+}+4LiOH \rightarrow NH_2SO_3Li^{+}Li_2SO_4+2LiF+H_2O, \text{ and}$$

a by-product lithium compound is removed by centrifugation and filtration before the desolventization step (f), optionally by a scraper centrifuge or a disc centrifuge.

In any embodiment, optionally, in step (e) and step (f), the ester solvent is independently selected from an organic solvent that has a boiling point greater than 70° C., preferably greater than 80° C., and preferably 100° C.-130° C. and is insoluble in water. Optionally, the ester solvent contains a carbonate solvent including ethylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate or a mixture of two or more thereof. Optionally, the ester solvent contains a carboxylate solvent such as propyl acetate, methyl propionate, ethyl propionate, propyl propionate, methyl butyrate, ethyl butyrate or a mixture of two or more. And further optionally, the ester solvent is selected from at least one of ethyl methyl carbonate, dimethyl carbonate or diethyl carbonate.

In any embodiment, optionally, temperature of the evaporation in the alkalinization step (d) is controlled to be 30° C.-40° C., optionally 30° C.-35° C.; and/or, temperature of the evaporation in the dehydration step (e) is controlled to be 40° C.-55° C., optionally 45° C.-50° C.; and/or, temperature of the evaporation in the desolventization step (f) is controlled to be 60° C.-80° C., optionally 65° C.-75° C.

In any embodiment, optionally, in step (d), step (e) and step (f), the lithium hydroxide aqueous solution is added so that a pH of the mixture in the evaporator is maintained in a range of 7-9, preferably a range of 8-9.

In any embodiment, optionally, in step (d), step (e) and step (f), a concentration of the lithium hydroxide aqueous solution is 1 mol/L to 15 mol/L, optionally 2 mol/L to 10 mol/L.

In any embodiment, between step (g) and step (h), the method includes pumping a stream containing the ester solvent, the dichloromethane and the lithium bis(fluorosulfonyl)imide crystals obtained through the crystallization step (g) into a two-in-one device with filtering and washing functions, where a crystallization liquid containing diethyl carbonate and dichloromethane is delivered for recovery treatment, and the remaining lithium bis(fluorosulfonyl)imide crystals fall into a drying kettle on the lower layer of the two-in-one device by gravity.

In any embodiment, optionally, in step (h), a liquid phase obtained after drying and condensation comprises dichloromethane and water, and the liquid phase is recycled and delivered to the crystallization step (g).

In any embodiment, optionally, a water content of the dichloromethane used in the crystallization step (g) is ≤200 ppm.

In any embodiment, optionally, the method further comprises (i) a canning step after the drying step (h), where after dissolution with a solvent and optionally acid removal, water removal and filtration, the powered lithium bis(fluorosulfonyl)imide crystals obtained in step (h) meet the following criteria: HF is ≤50 μg/g, and a water content is ≤20 μg/g.

In any embodiment, optionally, the solvent used in the dissolution in step (i) is the same as the ester solvents used in step (e) and step (f).

A second aspect of the present application further provides lithium bis(fluorosulfonyl)imide prepared by the method according to the first aspect of the present application.

A third aspect of the present application further provides an electrolytic solution including the lithium bis(fluorosulfonyl)imide prepared by the method according to the first aspect of the present application.

A fourth aspect of the present application further provides a secondary battery including the electrolytic solution according to the third aspect of the present application.

The electrolytic solution or the secondary battery of the present application includes the lithium bis(fluorosulfonyl)imide prepared according to the first aspect of the present application, and therefore has at least the same advantages as the method described in the first aspect of the present application.

DESCRIPTION OF EMBODIMENTS

Figure 1:
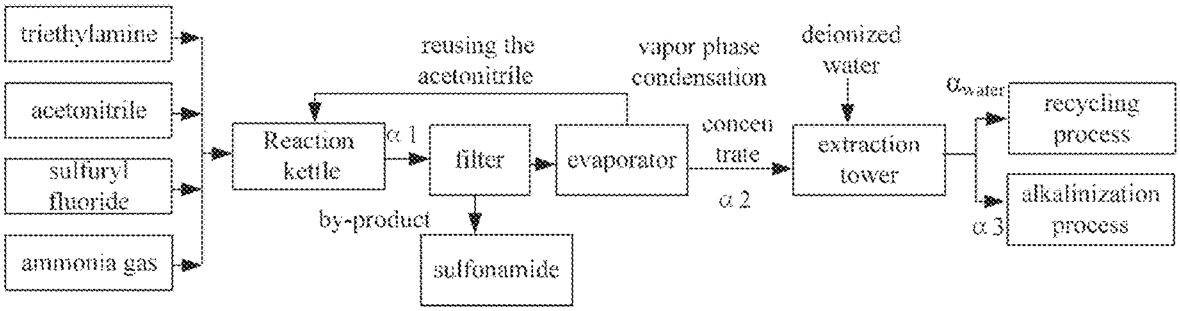
FIG. 1 shows a schematic flow chart of an α-stage process (synthesis→evaporation→extraction), in which an extraction tower is used in an extraction process.

Hereinafter, embodiments specifically disclosing a method for preparing lithium bis(fluorosulfonyl)imide of the present application will be described in detail with reference to drawings as appropriate. However, unnecessarily detailed descriptions may be omitted in some cases. For example, detailed description for a well-known matter and repeated description for a practically identical structure are omitted. This is done to avoid unnecessarily redundant descriptions for ease of understanding by persons skilled in the art. In addition, the drawings and the following description are provided for persons skilled in the art to fully appreciate the present application, and are not intended to limit the subject matters described in the claims.

A "range" disclosed herein is defined in the form of a lower limit and an upper limit. A given range is defined by selecting a lower limit and an upper limit, and the selected lower limit and upper limit define boundaries of a particular range. The range defined in this manner may or may not include end values, and may be combined arbitrarily, that is, any lower limit may be combined with any upper limit to form a range. For example, if ranges of 60-120 and 80-110 are listed for a particular parameter, it is understood that ranges of 60-110 and 80-120 are also anticipated. In addition, if the minimum range values listed are 1 and 2, and the maximum range values listed are 3, 4 and 5, all the following ranges can be anticipated: 1-3, 1-4, 1-5, 2-3, 2-4, and 2-5. In the present application, unless otherwise specified, a numerical range "a-b" represents an abbreviated representation of any combination of real numbers between a and b, where both a and b are real numbers. For example, a numerical range "0-5" means that all real numbers between "0-5" have been listed herein, and "0-5" is just an abbreviated representation of a combination of these numerical values. In addition, when a certain parameter is expressed as an integer ≥2, it is equivalent to disclosing that the parameter is, for example, an integer 2, 3, 4, 5, 6, 7, 8, 9, 10, 11, 12, or the like.

Unless otherwise specified, all embodiments and optional embodiments of the present application may be combined with each other to form a new technical solution.

Unless otherwise specified, all technical features and optional technical features of the present application may be combined with each other to form a new technical solution.

Unless otherwise specified, all steps of the present application may be performed sequentially or randomly, but preferably, performed sequentially. For example, a method includes steps (a) and (b), which means that the method may include steps (a) and (b) performed sequentially, or steps (b) and (a) performed sequentially. For example, the method mentioned may further include step (c), which means that step (c) may be added to the method in any order, for example, the method may include steps (a), (b) and (c), steps (a), (c) and (b), steps (c), (a) and (b), or the like.

Unless otherwise specified, words "comprising" and "containing" mentioned in the present application are open-ended or closed-ended. For example, the words "comprising" and "containing" may mean that other components that are not listed may further be comprised or contained, or only listed components may be comprised or contained.

The terms "more than" and "less than" used in the present application include the number at the endpoint, for example, "more than one" refers to one or more, and "more than one of A and B" refers to "A", "B" or "A and B".

In the present application, unless otherwise specified, the term "or" is inclusive. For example, the phrase "A or B" means "A, B or both A and B". More particularly, a condition "A or B" is satisfied by any one of the following: A is true (or present) and B is false (or not present); A is false (or not present) and B is true (or present); or both A and B are true (or present).

Unless otherwise specified, content and percentage in the context of the present disclosure are both based on mass.

Process route of the present disclosure is: synthesis→evaporation→extraction→alkalinization→dehydration→desolventization→crystallization→drying→canning (the canning step is an optional process). Each step will be further described below.

[Synthesis Step]

In the synthesis step (a) of the present disclosure, sulfuryl fluoride, ammonia gas and triethylamine are subjected to reaction in a reaction kettle in the presence of a solvent to obtain a stream α1 containing $(SO_2F—NH—SO_2F)·Et_3N$, a triethylamine hydrogen fluoride salt and triethylamine.

In some embodiments, in step (a), a molar ratio of the sulfuryl fluoride:the ammonia gas:the triethylamine is (1.5-3.5):1:(1-6), optionally (2-3):1:(1-5). In the present application, when the ammonia gas is excessive, a side reaction is likely to occur, which makes the reaction mixture turbid, and results in difficulty in subsequent filtration. Meanwhile, in order to make the color of materials lighter, it is necessary to avoid a long time contact between the sulfuryl fluoride and the triethylamine. Therefore, preferably, in step (a), acetonitrile and triethylamine are first added to the reaction device, and then a part of ammonia gas (preferably 2%-15% of the total amount of ammonia gas, preferably 3%-10%) is introduced, and finally ammonia gas and sulfuryl fluoride are introduced simultaneously for reaction.

In some embodiments, in step (a), the solvent is selected from acetonitrile, propionitrile, isopropionitrile, diethyl ether, propyl ether, isopropyl ether, tetrahydrofuran, acetone, butanone, methyl isobutyl ketone, methyl pyrrolidone or a mixture of any two or more thereof, preferably, acetonitrile.

In general, the reaction in (a) can be carried out in any suitable manner. For example, the reaction can be carried out in a batch reactor or in at least one semi-continuously operated reactor or at least one continuously operated reactor.

In some embodiments, in step (a), reaction temperature of the reaction is not higher than 25° C., optionally 3° C.-20° C.; and/or, reaction pressure of the reaction is not higher than 0.4 MPa, optionally not higher than 0.25 MPa. Excessive temperature and pressure will lead to more side reactions. In addition, if the temperature is too high, the solvent will easily vaporize, which results in excessive pressure in the reaction kettle and affects safe production.

The inventors of the present disclosure have found that when a molar ratio of the sulfuryl fluoride to the ammonia gas in step (a) is (1.5-4):1, preferably (2-3):1, particularly good yield and chroma are obtained.

In some embodiments, in step (a), at the end of the reaction, the stream α1 containing 30 wt % to 50 wt % of $(SO_2F—NH—SO_2F)·Et_3N$, 15 wt % to 30 wt % of the triethylamine hydrogen fluoride salt and 0 wt % to 10 wt % of the triethylamine is obtained.

In some embodiments, the stream α1 may be filtered more than once, preferably 2-5 times, optionally 2 times, and a pore diameter of a filter bag used for downstream filtration is smaller than that of an upstream filter bag.

[Evaporation Step]

In the evaporation step (b) of the present disclosure, the stream α1 is evaporated to obtain a stream α2 containing $(SO_2F—NH—SO_2F)·Et_3N$ and the triethylamine hydrogen fluoride salt, post-treatment is performed on the evaporated solvent and the triethylamine optionally, and then the method loops back to step (a).

In some embodiments, a step of filtering the stream α1 is further included between step (a) and step (b) to remove a by-product sulfonamide $(NH_2—SO_2—NH_2)$ solid, for example, performing filtration by using a tetrafluoro filter bag with a pore diameter of 5 μm to 20 μm, optionally 6 μm to 15 μm.

In some embodiments, in step (b), the stream $\alpha 1$ is evaporated by using a falling film evaporator. A heat exchange medium used in the falling film evaporator may be hot water, and temperature of a hot water bucket is 50° C. to 100° C., preferably 60° C. to 80° C.

In some embodiments, in step (b), the evaporation may be performed by using one or two or more evaporators connected in series, preferably a falling film evaporator.

In some embodiments, in step (b), the gas stream evaporated by the evaporator is condensed by using a condenser, preferably a condenser including a pre-condenser and a post-condenser, the pre-condenser is condensed with water at 0° C., and the post-condenser is condensed with water at −15° C. Optionally, internal pressure of the evaporator is −0.01 MPa to −0.1 MPa. Herein, those skilled in the art can understand that the water used in the condenser contains 30-50 wt % of antifreeze, and the antifreeze may be ethylene glycol or glycerin.

In some embodiments, the evaporation in step (b) is able to be performed in one or more evaporators.

In some embodiments, in step (b), the stream $\alpha 2$ includes 60 wt % to 80 wt % of $(SO_2F—NH—SO_2F)\cdot Et_3N$ and 20 wt % to 40 wt % of the triethylamine hydrogen fluoride salt.

[Extraction Step]

In the extraction step (c) of the present disclosure, the stream $\alpha 2$ obtained in step (b) is washed with water in an extraction tower or a static mixer to obtain an oil phase $\alpha 3$ containing $(SO_2F—NH—SO_2F)\cdot Et_3N$ and an aqueous phase $\alpha_{water}$ containing the triethylamine hydrogen fluoride salt, and the oil phase $\alpha 3$ is separated out.

In some embodiments, in step (c), a mass ratio of the water and the stream $\alpha 2$ that enter the extraction tower or the static mixer is 1:(1-2), optionally 1:(1.1-1.5).

In some embodiments, in step (c), the oil phase $\alpha 3$ further includes 5 wt % to 15 wt % of water.

In some embodiments, in step (c), the $\alpha_{water}$ includes 75 wt % to 80 wt % of water and 20 wt % to 25 wt % of the triethylamine hydrogen fluoride salt.

In some embodiments, in step (c), the aqueous phase containing the triethylamine hydrogen fluoride salt is delivered for recycling treatment, and triethylamine obtained after the aqueous phase is subjected to alkalinization and purification treatment is recyclable. In addition to the triethylamine hydrogen fluoride salt, the aqueous phase also contains an impurity ion (such as $F^-$, $SO_4^{2-}$, $FSO_3^-$ or $Cl^-$). After the alkalinization and purification treatment in a recycling section, the triethylamine is recyclable, and additional economic benefits can be generated by KF sales.

In the present application, the extraction tower may be an extraction tower conventionally used in the art, such as a packed extraction tower, a sieve tray extraction tower, a rotating disc extraction tower, a vibrating sieve tray tower, a multistage centrifugal extraction tower, preferably a rotating disc extraction tower.

In some embodiments, the extraction step is carried out in an extraction tower (stirring frequency is 15±1 HZ; a weight ratio of deionized water used to $\alpha 2$ therein is 1:(1-1.6), preferably 1:(1-1.4)). A light phase (low density) enters from the bottom of the side of the extraction tower and is discharged from the top of the extraction tower; and a heavy phase enters from the top of the side of the extraction tower and is discharged from the bottom of the extraction tower, and the middle is stirred in a spiral shape (stirring effect is better, and washing and separation conditions are more superior). Unexpectedly, the inventors find that using the extraction tower for extraction can achieve better separation of an impurity ion (such as $F^-$). After treatment by the static mixer, an F ion content in $\alpha 3$ is ≥1000 ppm, and more LiOH needs to be consumed in the following alkalinization process; however, after treatment by the extraction tower, the F ion content in $\alpha 3$ is ≤100 ppm.

In the present application, measuring an F ion content and a water content in a stream is a method well known in the art, for example, measuring an F ion content by alizarin complex colorimetry, and measuring a water content by a Karl Fischer method.

In some embodiments, in step (c), the stream $\alpha 2$ obtained in step (b) is washed with water in the extraction tower.

In the present application, the static mixer may be a static mixer conventionally used in the art, such as a pipeline static mixer. In the case of using a static mixer, the resulting mixture needs to be pumped into a layering tank for standing layering, which usually lasts for 1-10 hours, preferably 2-6 hours.

In the present application, unless otherwise specified, the water used in the text is always deionized water, which can reduce the type and content of impurity contained in a final product to the largest extent.

[Alkalinization Step]

In the alkalinization step (d) of the present disclosure, the oil phase $\alpha 3$ obtained in step (c) is delivered to an evaporator to be mixed with a lithium hydroxide aqueous solution to obtain a mixture stream $\beta 1\text{-}1$, and then the stream $\beta 1\text{-}1$ is evaporated under reduced pressure to obtain a stream $\beta 1\text{-}2$ containing lithium bis(fluorosulfonyl)imide.

In some embodiments, the alkalinization of step (d) is carried out according to the following reaction formula:

$$(SO_2F—NH—SO_2F)\cdot Et_3N+LiOH \rightarrow (SO_2F—N—SO_2F)^-Li^+(LiFSI)+Et_3N+H_2O.$$

The principle of the reaction is that a strong base replaces a weak base, and the alkalinity of LiOH is higher than that of triethylamine in $(SO_2F—NH—SO_2F)\cdot Et_3N$, so that the triethylamine is replaced and the triethylamine is removed through falling film evaporation, and at the same time LiOH reacts with $(SO_2F—NH—SO_2F)\cdot Et_3N$ to generate lithium bis(fluorosulfonyl)imide (which is abbreviated as LiFSI).

In some embodiments, in step (d), before evaporating the stream $\beta 1\text{-}1$, the oil phase $\alpha 3$ is mixed and stirred with the lithium hydroxide aqueous solution for reaction for 0.5-3 hours, optionally 1-2 hours.

In some embodiments, in step (d), a concentration of the lithium hydroxide aqueous solution is 1 mol/L to 15 mol/L, optionally 2 mol/L to 10 mol/L.

In some embodiments, in step (d), a condensate obtained by evaporating the stream $\beta 1\text{-}1$ is subjected to standing liquid separation, an upper layer liquid is a triethylamine aqueous solution, and the upper layer liquid is delivered for recycling treatment; and a lower layer liquid is condensed water, and the lower layer liquid is recycled to prepare the lithium hydroxide aqueous solution required for the alkalinization step.

In some embodiments, in step (d), a volume ratio of the oil phase $\alpha 3$ to the lithium hydroxide aqueous solution is (0.8-5):1, optionally (1-1.2):1.

In some embodiments, in step (d), the lithium hydroxide aqueous solution is added so that a pH of the mixture in the evaporator is maintained in a range of 7-9, preferably a range of 8-9.

In some embodiments, in step (d), the evaporation is performed by using a falling film evaporator, and temperature of the evaporation is controlled to be 30° C.-40° C., optionally 30° C.-35° C.

In some embodiments, the evaporation in step (d) is able to be performed in one or more evaporators.

In some embodiments, in step (d), the stream β1-2 includes 70 wt % to 90 wt % of lithium bis(fluorosulfonyl) imide and 5 wt % to 25 wt % of water, and the balance is LiF, $Li_2SO_4$ and lithium sulfamate, etc., based on 100 wt % of stream β1-2.

[Dehydration Step]

In the dehydration step (e) of the present disclosure, the stream β1-2 containing the lithium bis(fluorosulfonyl)imide and an ester solvent are added to an evaporator for evaporation to obtain a stream 12 containing lithium bis(fluorosulfonyl)imide.

In some embodiments, in step (e), an aqueous solution of the ester solvent obtained by condensation is delivered for recycling treatment.

In some embodiments, in step (e), the stream β1-2 is mixed with the ester solvent at a volume ratio of 1:(0.4-0.8), preferably 1:(0.5-0.7).

In some embodiments, in step (e), the obtained stream 12 further contains 0.1 vol % to 2 vol % of the water and 20 vol % to 40 vol % of the ester solvent.

In some embodiments, in step (e), the evaporator is a falling film evaporator, and temperature of the evaporation is controlled to be 40° C.-55° C., optionally 45° C.-50° C.

In some embodiments, the evaporation in step (e) is able to be performed in one or more evaporators.

Since lithium salts have strong hygroscopicity, it is difficult to reduce the moisture to the required level by evaporation alone. For example, adsorption of lithium salts to water can be weakened by adding a large amount of ester organic solvents (such as carbonates and carboxylates, preferably DEC and EMC) that are insoluble in water and have a boiling point preferably greater than water (such as 100-130° C.), so evaporation and dehydration while adding the ester organic solvents can reduce the moisture to the required content, for example, less than 3000 ppm. A mixture of ester organic solvents and water obtained by condensation is recyclable after purification treatment in the recycling section.

In some embodiments, optionally, during step (d) and step (e), a following side reaction takes place:

$$(SO_2F—N—SO_2F)^-Li^+ + 4LiOH—NH_2SO_3Li^+ \; Li_2SO_4 + 2LiF + H_2O.$$

Before a desolventization step (f), a by-product lithium compound (such as $NH_2SO_3Li$, $Li_2SO_4$ and 2LiF) is optionally removed by centrifugation and filtration, such as by a scraper centrifuge or a disc centrifuge.

In some embodiments, an ester solvent is mixed with the stream β1-2, and a pH of the mixture is maintained at 7-9 while evaporation and dehydration are performed, and optionally centrifugation and filtration are performed to obtain a stream β2 containing 60 wt % to 80 wt % of lithium bis(fluorosulfonyl)imide, 20 wt % to 40 wt % of the ester solvent and 0.2 wt % to 1.5 wt % of water.

In some embodiments, in step (e), a pH of the mixture is maintained at 7-9, preferably 8-9 by adding the lithium hydroxide aqueous solution during the evaporation.

In some embodiments, in step (e), a concentration of the lithium hydroxide aqueous solution is 1 mol/L to 15 mol/L, optionally 2 mol/L to 10 mol/L.

[Desolventization Step]

In the desolventization step (f) of the present disclosure, the stream β2 obtained in step (e) and an ester solvent are added to an evaporator for evaporation to obtain crude lithium bis(fluorosulfonyl)imide β3.

In some embodiments, after the dehydration step (e) and before the desolventization step (f), a by-product lithium compound (such as $NH_2SO_3Li$, $Li_2SO_4$ and LiF) is optionally removed by centrifugation and filtration, such as by a scraper centrifuge or a disc centrifuge, so as to obtain a stream β2-1.

In some embodiments, in step (f), the stream β2 or the stream β2-1 is mixed with an ester solvent at a volume ratio of 1:(0.1-0.4), preferably 1:(0.2-0.3).

In some embodiments, in step (f), the evaporator is a scraper evaporator, and temperature of the evaporation is controlled to be 60-80° C., optionally 65-75° C.

In some embodiments, the evaporation in step (f) is able to be performed in one or more evaporators.

In some embodiments, the lithium bis(fluorosulfonyl) imide β3 obtained in step (f) has a water content of 2000 ppm to 4000 ppm, preferably a water content of 3000 ppm. By continuing to mix the stream β2 or the stream β2-1 obtained by filtration with the ester solvent in step (e), and then continuing to perform evaporation, the water in the stream β2 or the stream β2-1 can be further removed.

In some embodiments, in step (f), the lithium bis(fluorosulfonyl)imide β3 contains 80 wt % to 90 wt % of the lithium bis(fluorosulfonyl)imide and 10 wt % to 20 wt % of the ester solvent.

In some embodiments, in step (f), an aqueous solution of the ester solvent obtained by condensation is delivered for recycling treatment.

In the present application, during the alkalinization, dehydration and desolventization steps, a pH of the mixture is always required to be maintained in a range of 7-9, preferably 8-9. Preferably, by adding a solvent lithium hydroxide, a weak alkaline system is kept, and decomposition of a product is suppressed.

In some embodiments, a pH of the evaporated mixture is maintained in the range of 7-9, preferably 8-9 by adding the lithium hydroxide aqueous solution.

In some embodiments, in step (f), a concentration of the lithium hydroxide aqueous solution is 1 mol/L to 15 mol/L, optionally 2 mol/L to 10 mol/L.

Since a lithium salt is dissolved in an ester solvent such as diethyl carbonate, a certain amount of ester solvents are required to be evaporated and removed, otherwise crystallization cannot be implemented or crystallization rate can be very low in the later stage.

In some embodiments, optionally, step (e) and step (f) are performed in a same evaporator, or step (e) and step (f) are performed in different evaporators.

[Crystallization Step]

In the crystallization step (g) of the present disclosure, the crude lithium bis(fluorosulfonyl)imide β3 obtained in step (f) is pumped to a crystallization kettle, and dichloromethane is added to precipitate lithium bis(fluorosulfonyl)imide crystals.

In some embodiments, in the crystallization step (g), a water content of the dichloromethane used is ≤200 ppm. If the water content of dichloromethane is too high, it will affect the production of crystal nucleus of lithium bis(fluorosulfonyl)imide, and as a result, the crystals are too small and too thin, and are not easy to dry in the future.

In some embodiments, optionally, between step (g) and step (h), the method includes pumping a stream containing the ester solvent, the dichloromethane and the lithium bis (fluorosulfonyl)imide crystals obtained through the crystallization step (g) into a two-in-one device with filtering and washing functions, where a crystallization liquid containing diethyl carbonate and dichloromethane is delivered for recovery treatment, and the remaining lithium bis(fluorosulfonyl)imide crystals fall into a drying kettle on the lower layer of the two-in-one device by gravity.

[Drying Step]

In the drying step (h) of the present disclosure, the lithium bis(fluorosulfonyl)imide crystals precipitated in step (g) are purged with an inert gas in a drier, to obtain powered lithium bis(fluorosulfonyl)imide crystals with a water content lower than 50 ppm.

In some embodiments, in step (h), a liquid phase obtained after drying and condensation includes dichloromethane and water, and the liquid phase is recycled and delivered to the crystallization step (g).

[Canning Step]

The method of the present disclosure further includes (i) a canning step after the drying step (h), where after dissolution with a solvent and optionally acid removal, water removal and filtration, the powered lithium bis(fluorosulfonyl)imide crystals obtained in the drying step meet the following criteria: HF is ≤50 μg/g, and a water content is ≤20 μg/g. If the HF content in the dissolved solution is detected to exceed the limit (for example, HF>50 μg/g), lithium hydroxide is used for acid removal. If the water content in the dissolved solution is detected to exceed the limit (for example, water content >20 μg/g), a molecular sieve is used for water removal.

In some embodiments, the solvent used in the dissolution in step (i) is the same as the ester solvents used in step (e) and step (f).

A second aspect of the present application further provides lithium bis(fluorosulfonyl)imide prepared by the method according to the first aspect of the present application.

A third aspect of the present application further provides an electrolytic solution including the lithium bis(fluorosulfonyl)imide prepared by the method according to the first aspect of the present application.

A fourth aspect of the present application further provides a secondary battery including the electrolytic solution according to the third aspect of the present application.

The electrolytic solution or the secondary battery of the present application includes the lithium bis(fluorosulfonyl) imide prepared according to the first aspect of the present application, and therefore has at least the same advantages as the method described in the first aspect of the present application.

Raw and auxiliary materials used in a LiFSI synthesis process route of the present disclosure are all relatively common chemical products. Production cost is low, there is no high temperature and high pressure in a reaction process, and exothermic heat of a front-end synthesis reaction is cooled by a refrigerator to ensure the reaction at low temperature and high safe coefficient of the reaction. As a result, LiFSI is low in the production cost, less in three wastes, high in purity, and the raw materials can be fully recycled for use, and a by-product can also be purified to generate additional economic benefits, which is suitable for industrial production. By recovering and recycling the raw materials, consumption of the raw and auxiliary materials is reduced, a utilization rate of the raw materials of reaction is improved, discharge and treatment costs of compounds are reduced, production costs are effectively reduced, and economic benefits are improved.

EXAMPLES

Examples of the present application will be described hereinafter. The examples described below are exemplary and merely used to explain the present application, and may not be understood as limitation to the present application. Where specific techniques or conditions are not specified in the examples, they are performed according to techniques or conditions described in the literature in the art or according to product specifications. Reagents or instruments used without specifying the manufacturer are all commercially available conventional products.

Example 1

Synthesis Step→Evaporation Step→Extraction Step

An α-stage process (synthesis→evaporation→extraction) is described with reference to FIG. 1, in which an extraction tower is used in an extraction process.

40 $m^3$ of triethylamine and 35 $m^3$ of acetonitrile were pumped into a synthesis kettle with a volume of 100 $m^3$, temperature of the kettle was reduced to 15° C., then 120 kg of ammonia gas was first introduced, and finally ammonia gas (2000 kg) and sulfuryl fluoride (26000 kg) were introduced simultaneously, while pressure in the kettle was maintained at 0.3 MPa, and temperature in the kettle was maintained at 15° C. After reaction lasted for 4 h, pressure in the kettle was reduced to 0.1 MPa, and stirring was stopped. A reaction mixture stream α1 obtained (containing 40 wt % of $(SO_2F—NH—SO_2F)·Et_3N$, 18 wt % of triethylamine hydrogen fluoride salt and 6 wt % of triethylamine) was filtered through a tetrafluoro filter bag with a pore diameter of 5 μm to filter out a solid by-product sulfonamide. A filtrate was pumped into a falling film evaporator (a temperature of a hot water bucket was 75° C.), and a solvent in the filtrate was evaporated under a vacuum degree of −0.02 MPa (a front stage of a vacuum pump was condensed with water at 0° C., and a latter stage was condensed with water at −15° C.) to obtain a stream α2 containing $(SO_2F—NH—SO_2F)·Et_3N$ and the triethylamine hydrogen fluoride salt (containing 70 wt % of $(SO_2F—NH—SO_2F)·Et_3N$ and 28 wt % of the triethylamine hydrogen fluoride salt) and a condensate containing acetonitrile. The condensate was recycled for synthesis in the synthesis kettle in the first step. The stream α2 was pumped to a rotary disc extraction tower (a stirring frequency is 15±1 Hz; and a flow rate was controlled so that a weight ratio of deionized water to α2 is 1:1.2), and was fully mixed with deionized water in the extraction tower to obtain an aqueous phase $\alpha_{water}$ containing the triethylamine hydrogen fluoride salt as an upper layer liquid (containing 77 wt % of the water and 22 wt % of the triethylamine hydrogen fluoride salt), and an oil phase α3 containing $(SO_2F—NH—SO_2F)·Et_3N$ as a lower layer liquid (also containing 15 wt % of the water). The upper aqueous phase was delivered to a recycling workshop for treatment, and the lower oil phase was delivered to an alkalinization step. Upon detection, the oil phase α3 also contained 100 ppm of $F^-$.

[Alkalinization Step→Dehydration Step→Desolventization Step]

Figure 3:
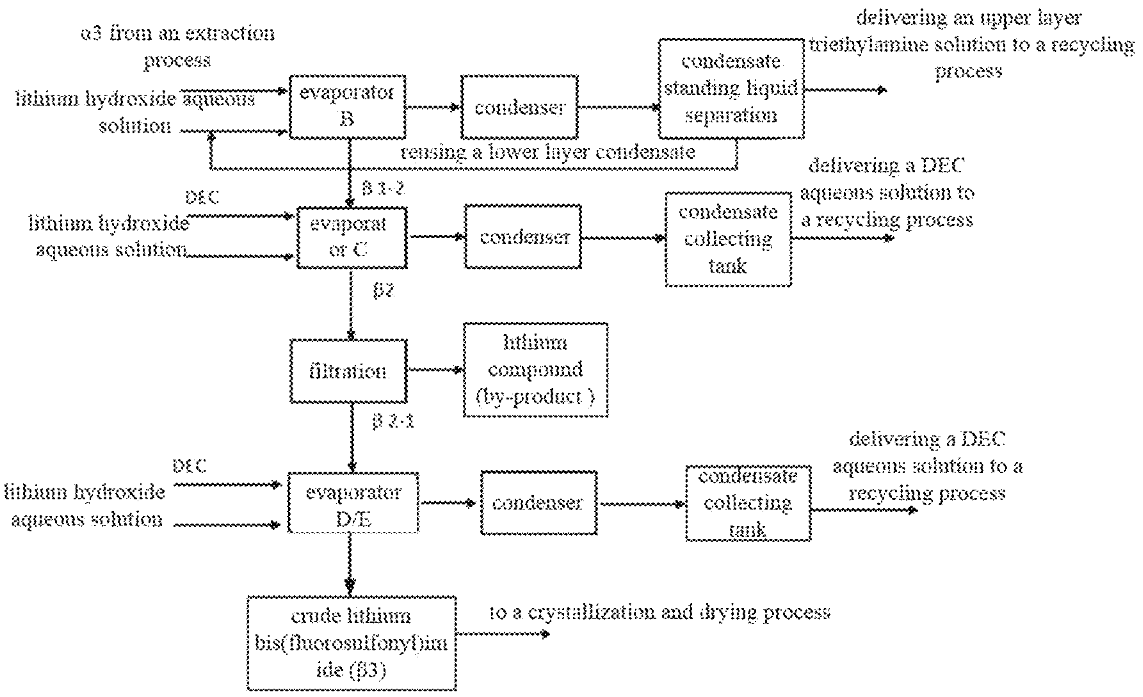
FIG. 3 is a schematic flow chart of a j-stage process (alkalinization→dehydration→desolventization).

A β-stage process (alkalinization→dehydration→desolventization) is described with reference to FIG. 3.

The stream α3 was directly alkalinized in a falling film evaporator B (a steam heating temperature of a hot water bucket was 35° C.), and a lithium hydroxide aqueous solution (with a concentration of 5 mol/L, where a volume ratio of the stream α3 to the lithium hydroxide aqueous solution is 1.1:1) was dropped while stirring was performed continuously. After the reaction lasted for 1 hour, a mixture stream β1-1 (a crude lithium salt) was obtained. At the same time, hot water at 35° C. was used for heating, and vacuum was activated to keep the vacuum degree in the kettle at −0.08 MPa, and steaming time was 6 hours. The front and latter stages of the vacuum pump performed five-stage condensation with water at 25° C. and 0° C. respectively. The condensate was left for standing liquid separation, the upper layer was a triethylamine aqueous solution and pumped to the recycling workshop for recycling, and the lower layer was recovered for the alkalinization process to prepare the lithium hydroxide aqueous solution. After evaporation in the falling film evaporator B, a stream β1-2 containing lithium bis(fluorosulfonyl)imide (containing 85 wt % of the lithium bis(fluorosulfonyl)imide and 10 wt % of the water) was obtained. During the evaporation in the falling film evaporator B, a lithium hydroxide aqueous solution (with a concentration of 5 mol/L) was added to maintain a pH of the stream β1-2 at 8.

The stream β1-2 was continued to be evaporated in a falling film evaporator C (a steam heating temperature of a hot water bucket was 50° C.). At the same time, diethyl carbonate (DEC) was metered and pumped (a flowmeter was controlled so that a volume ratio of DEC to the stream β1-2 was 0.6:1), vacuum (−0.08 MPa) heating and evaporation were continued, and the front and latter stages of the vacuum pump performed five-stage condensation with water at normal temperature (25° C.) and 0° C. respectively, and the condensate was an aqueous solution containing DEC. The condensate was delivered to the recycling workshop for recycling. After evaporation in the falling film evaporator C, a stream β2 containing lithium bis(fluorosulfonyl)imide (containing 70 wt % of the lithium bis(fluorosulfonyl)imide, 29 wt % of diethyl carbonate and 1 wt % of the water) was obtained. During the evaporation in the falling film evaporator C, a lithium hydroxide aqueous solution (with a concentration of 5 mol/L) was metered and added to maintain a pH of the stream β2 at 8.

The stream β2 obtained after being evaporated by the falling film evaporator C was centrifuged and filtered through a disc centrifuge (with a rotation speed of 1500 rpm) to filter out a by-product lithium compound, so as to obtain a stream β2-1 containing 1 wt % of the water, 30 wt % of the diethyl carbonate and 69 wt % of the lithium bis(fluorosulfonyl)imide. The stream β2-1 was then pumped into a scraper evaporator D (a steam heating temperature of a hot water bucket was 75° C.), and at the same time, diethyl carbonate (DEC) was metered and pumped (a flowmeter was controlled so that a volume ratio of DEC to the stream β2-1 was 0.25:1), and vacuum (with a vacuum degree of −0.08 MPa) heating, evaporation and dehydration were continued. A lithium hydroxide solution (with a concentration of 5 mol/L) was also added while evaporation was performed by a scraper evaporator D so that a pH of a stream β3 obtained was maintained at 8. A condensate mainly contained DEC and a small amount of water, and the condensate was delivered to the recycling workshop for recycling. After 6 hours of evaporation, lithium bis(fluorosulfonyl)imide 33 (containing 85 wt % of the lithium bis(fluorosulfonyl)imide and 15 wt % of the diethyl carbonate) with a water content of 3000 ppm was obtained.

[Crystallization Step→Drying Step]

Figure 4:
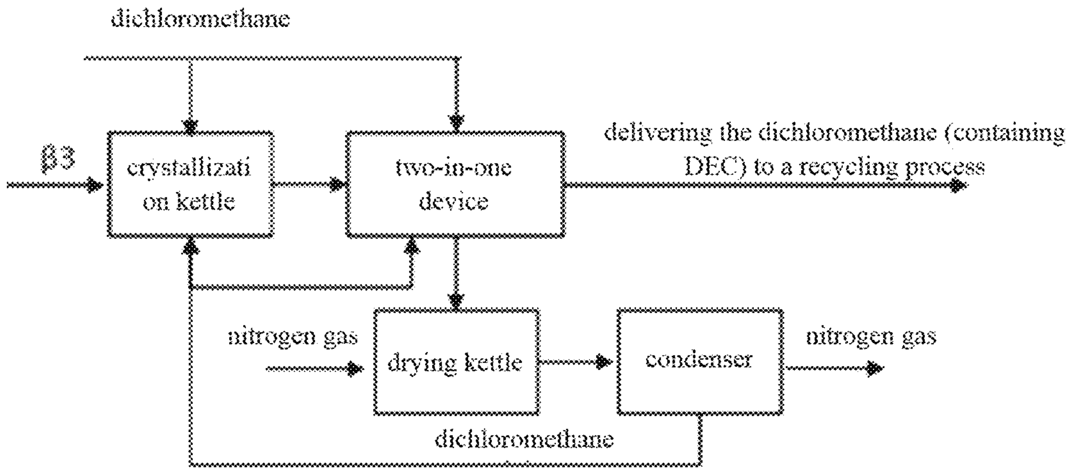
FIG. 4 is a schematic flow chart of a crystallization and drying process.

A crystallization and drying process is described with reference to FIG. 4.

β3 was pumped to a crystallization kettle, and dichloromethane with a water content of 100 ppm was pumped at a speed of 20 L/h. After stirring and mixing, β3 and the dichloromethane were pumped into a two-in-one device with filtering and washing functions, where the dichloromethane (containing DEC) was delivered to a recycling workshop for recycling, and the remaining lithium bis(fluorosulfonyl)imide crystals falled into a drying kettle on the lower layer of the two-in-one device by gravity. Nitrogen gas was introduced in a drier to purge the crystals for drying, and drying temperature was 60° C. After drying and condensation, a condensate contained 99.5% dichloromethane and 0.5% water, and the condensate was delivered to a crystallization process for recycling. After the crystal water dropped to a target limit (50 ppm), the obtained powder product was delivered to a canning section.

Upon detection, purity of lithium bis(fluorosulfonyl)imide powder obtained after the drying step was 99.8%, and yield reached 92%, where a free acid content was 10 μg/g and a water content was 20 μg/g.

[Canning Step]

Figure 5:
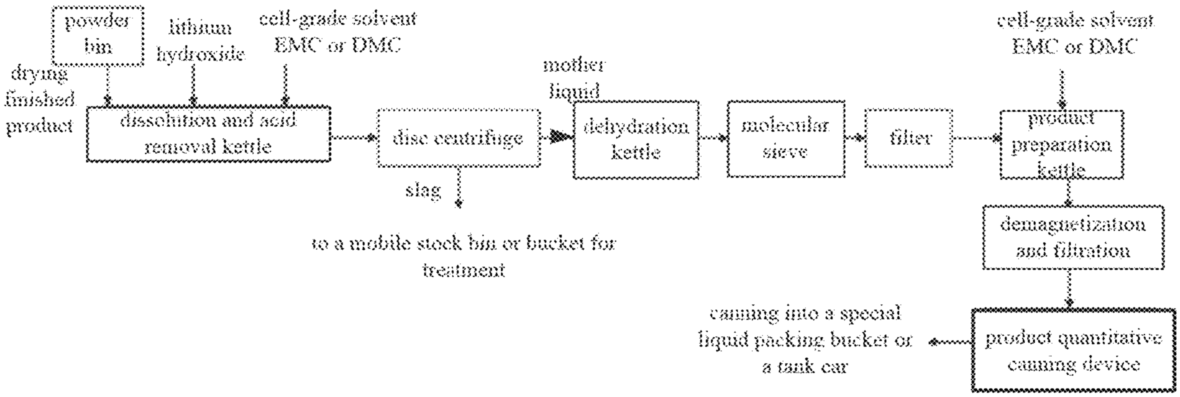
FIG. 5 is a schematic flow chart of a canning process.

An optional canning process is described with reference to FIG. 5.

70 L of diethyl carbonate and 0.1 kg of lithium hydroxide were added to 30 kg of the lithium bis(fluorosulfonyl)imide powder obtained after crystallization and drying. Then a disc centrifuge was used to perform centrifugation (with a rotation speed of 1500 rpm) to remove a solid, then a filtrate was delivered to a dehydration kettle in which 20 kg of molecular sieves were added, for stirring at a rotation speed of 800 rpm and treatment for 2 h. Then a filter was used to filter out the molecular sieves, and a filtrate obtained was delivered to a product preparation kettle. Finally, demagnetization (a vertical demagnetization filter, 8000 gauss) and filtration (through a 1 micron filter, a 0.5 micron filter, and a 0.1 micron filter, respectively) were performed to obtain a diethyl carbonate solution containing lithium bis(fluorosulfonyl)imide with a concentration of 28 wt % (HF is ≤50 μg/g, and a water content is ≤20 μg/g), and canning was performed finally.

Figure 2:
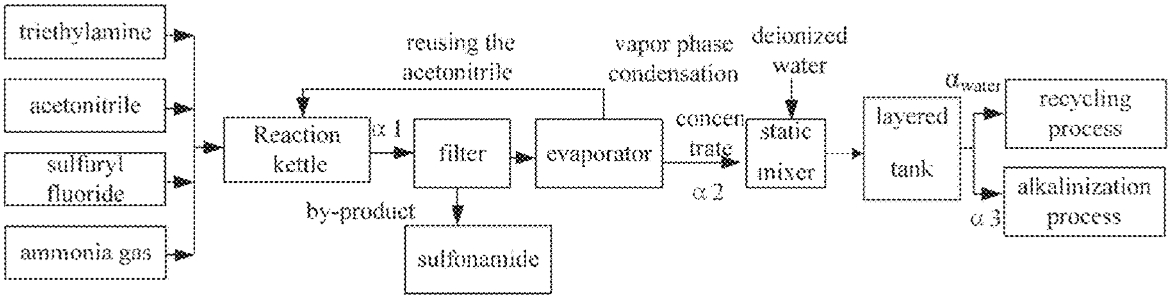
FIG. 2 shows a schematic flow chart of an α-stage process (synthesis→evaporation→extraction), in which a static mixer is used in an extraction process.

Example 2: Technical solution of Example 2 is the same as that of Example 1, and differs in that in an extraction step, a static mixer is adopted in an extraction process (a ratio of length to pipe diameter L/D=10; and a flow is controlled so that a weight ratio of deionized water to α2 is 1:1.2). As shown in FIG. 2, the stream α2 was pumped to a static mixer to be fully mixed with deionized water in the static mixer, and delivered to a layered tank for standing layering for 2 hours, to obtain an aqueous phase $\alpha_{water}$ containing a triethylamine hydrogen fluoride salt as an upper layer liquid and an oil phase α3 containing $(SO_2F—NH—SO_2F)\cdot Et_3N$ as a lower layer liquid, the upper layer aqueous phase was delivered to a recycling workshop for treatment, and the lower layer oil phase was delivered to an alkalinization step. Upon detection, the oil phase α3 contained 1000 ppm of $F^-$.

Upon detection, purity of lithium bis(fluorosulfonyl)imide powder obtained after the drying step in Example 2 was 99.2%, and yield reached 89%, where a free acid content was 15 μg/g and a water content was 25 μg/g.

It should be noted that the present application is not limited to the foregoing embodiments. The foregoing embodiments are merely examples, and embodiments having substantially the same constitution as the technical idea and exerting the same effects within the technical solution of the present application are all included within the technical scope of the present application. In addition, various modifications made to the embodiments that are easily thought of by persons skilled in the art without departing from the spirit of the present application, and other embodiments that are constructed by combining some of the constituent elements of the embodiments are also included in the scope of the present application.

What is claimed is:

1. A method for preparing lithium bis(fluorosulfonyl) imide, comprising the following steps:

(a) a synthesis step: subjecting sulfuryl fluoride, ammonia gas and triethylamine to reaction in a reaction kettle in the presence of a solvent to obtain a stream α1 containing ($SO_2F$—NH—$SO_2F$)·$Et_3N$, a triethylamine hydrogen fluoride salt and triethylamine;

(b) an evaporation step: performing evaporation on the stream α1 to obtain a stream α2 containing ($SO_2F$—NH—$SO_2F$)·$Et_3N$ and the triethylamine hydrogen fluoride salt, performing post-treatment on the evaporated solvent and the triethylamine optionally, and then looping back to step (a);

(c) an extraction step: washing the stream α2 obtained in step (b) with water in an extraction tower or a static mixer to obtain an oil phase α3 containing ($SO_2F$—NH—$SO_2F$)·$Et_3N$ and an aqueous phase $\alpha_{water}$ containing the triethylamine hydrogen fluoride salt, and separating out the oil phase α3;

(d) an alkalinization step: delivering the oil phase α3 obtained in step (c) to an evaporator to be mixed with a lithium hydroxide aqueous solution to obtain a mixture stream β1-1, and then performing reduced-pressure evaporation on the stream β1-1 to obtain a stream β1-2 containing lithium bis(fluorosulfonyl)imide;

(e) a dehydration step: adding the stream β1-2 containing the lithium bis(fluorosulfonyl)imide and an ester solvent to an evaporator for evaporation to obtain a stream β2 containing lithium bis(fluorosulfonyl)imide;

(f) a desolventization step: adding the stream β2 obtained in step (e) and an ester solvent to an evaporator for evaporation to obtain crude lithium bis(fluorosulfonyl) imide β3; and (g) a crystallization step: pumping the crude lithium bis(fluorosulfonyl)imide β3 obtained in step (f) to a crystallization kettle, and adding dichloromethane to precipitate lithium bis(fluorosulfonyl)imide crystals.

2. The method according to claim 1, wherein the method further comprises the following step:

(h) a drying step: purging with an inert gas the lithium bis(fluorosulfonyl)imide crystals precipitated in step (g) in a drier, to obtain powered lithium bis(fluorosulfonyl)imide crystals with a water content lower than 50 ppm.

3. The method according to claim 1, wherein in step (a), a molar ratio of the sulfuryl fluoride:theammoniagas:the triethylamine is (1.5-3.5):1:(1-6).

4. The method according to claim 1, wherein in step (a), the solvent is selected from acetonitrile, propionitrile, isopropionitrile, diethyl ether, propyl ether, isopropyl ether, tetrahydrofuran, acetone, butanone, methyl isobutyl ketone, methyl pyrrolidone or a mixture of any two or more thereof.

5. The method according to claim 1, wherein in step (a), reaction temperature of the reaction is not higher than 25° C.; and/or, reaction pressure of the reaction is not higher than 0.4 MPa.

6. The method according to claim 1, wherein between step (a) and step (b), the method further comprises a step of filtering the stream α1 to remove a by-product sulfonamide solid, optionally, the step of filtering comprises performing filtration by using a tetrafluoro filter bag with a pore diameter of 5 μm to 20 μm.

7. The method according to claim 1, wherein in step (b), the stream α1 is evaporated by using a falling film evaporator.

8. The method according to claim 1, wherein in step (c), the aqueous phase $\alpha_{water}$ containing the triethylamine hydrogen fluoride salt is delivered for recycling treatment, and triethylamine obtained after the aqueous phase $\alpha_{water}$ is subjected to alkalinization and purification treatment is recyclable.

9. The method according to claim 1, wherein in step (d), the oil phase α3 is mixed and stirred with the lithium hydroxide aqueous solution for reaction for 0.5-3 hours.

10. The method according to claim 1, wherein in step (d), a condensate obtained by evaporating the stream β1-1 is subjected to standing liquid separation, an upper layer liquid is a triethylamine aqueous solution, and the upper layer liquid is delivered for recycling treatment; and a lower layer liquid is condensed water, and the lower layer liquid is recycled to prepare the lithium hydroxide aqueous solution required for the alkalinization step.

11. The method according to claim 1, wherein in step (d), a volume ratio of the oil phase α3 to the lithium hydroxide aqueous solution is (0.8-5):1.

12. The method according to claim 1, wherein in step (e) and step (f), an aqueous solution of the ester solvent obtained by condensation is delivered for recycling treatment.

13. The method according to claim 1, wherein in step (e), the obtained stream β2 contains 0.1 vol % to 2 vol % of the water and 20 vol % to 40 vol % of the ester solvent.

14. The method according to claim 1, wherein the crude lithium bis(fluorosulfonyl)imide β3 obtained in step (f) has a water content of 2000 ppm to 4000 ppm.

15. The method according to claim 1, wherein step (e) and step (f) are performed in a same evaporator, or step (e) and step (f) are performed in different evaporators.

16. The method according to claim 1, wherein during step (d) and step (e), a following side reaction takes place:

$$(SO_2F—N—SO_2F)^-Li^+ + 4LiOH \rightarrow NH_2SO_3Li + Li_2SO_4 + 2LiF + H_2O,$$ and a by-product lithium compound is removed by centrifugation and filtration before the desolventization step (f), optionally by a scraper centrifuge or a disc centrifuge.

17. The method according to claim 1, wherein in step (e) and step (f), the ester solvent is selected from an organic solvent that has a boiling point greater than 70° C., and is insoluble in water.

18. The method according to claim 1, wherein temperature of the evaporation in the alkalinization step (d) is controlled to be 30° C.-40° C.; and/or, temperature of the evaporation in the dehydration step (e) is controlled to be 40° C.-55° C.; and/or, temperature of the evaporation in the desolventization step (f) is controlled to be 60° C.-80° C.

* * * * *